April 28, 1931.   M. K. PARKHURST ET AL   1,803,284
MEASURING GAUGE
Filed March 10, 1928
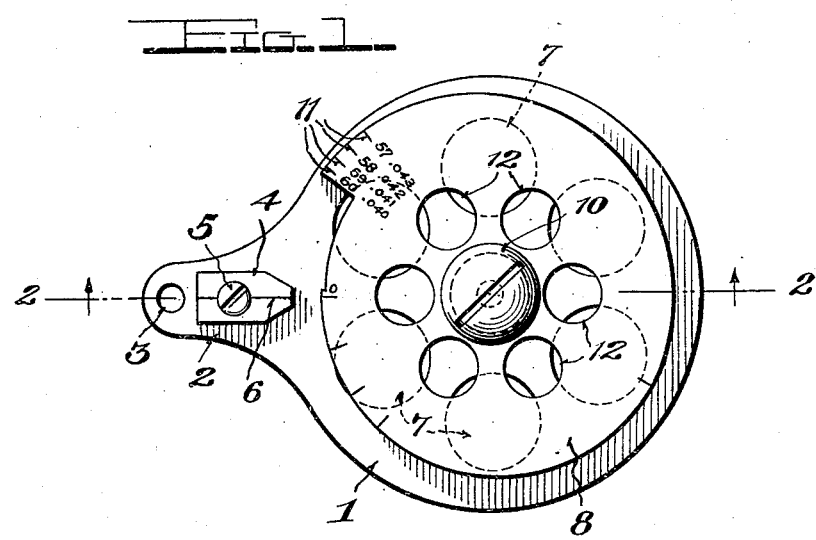
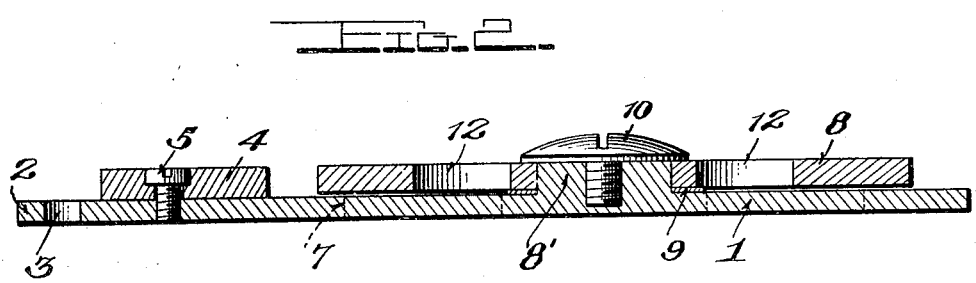
Inventors
Malcolm K. Parkhurst
By John W. Parker
Joseph A. Miller
Attorney Patented Apr. 28, 1931

1,803,284

UNITED STATES PATENT OFFICE

MALCOLM K. PARKHURST, OF NEW YORK, N. Y., AND JOHN W. PARKER, OF BARRINGTON, RHODE ISLAND, ASSIGNORS TO BROWN & SHARPE MFG. CO., OF PROVIDENCE, RHODE ISLAND

MEASURING GAUGE

Application filed March 10, 1928. Serial No. 260,575.

This invention relates to measuring gauges, and particularly for the measuring of wire or twist drills, although susceptible of use with other articles or objects within the range of the invention.

The primary object of the invention is to provide a gauge which can be easily and very quickly operated to measure the article and more specifically aims to provide a gauge of the type in which a disk-like member having graduations thereon is rotatably and freely mounted so as to be easily and quickly rotated into measuring position.

The invention further aims to provide a device of this type which is of simple, compact and economical construction and one wherein but a single movable member is involved.

The invention has further and other objects which will be later set forth and manifested in the course of the following description.

In the drawings:—

Figure 1 is a top plan view of the invention;

Figure 2 is a section on line 2—2 of Figure 1.

In proceeding in accordance with the present invention, a base plate 1 is employed which may be laid flat on the work bench or table and preferably has a radial extension 2 which latter may be provided with an opening 3 to receive a hook or the like by means of which the device may be hung on the wall or in a case as desired.

An anvil 4 is fixedly secured by means of a screw 5 to the extension 2 and is formed with an index or reading line 6. The anvil is disposed radially of the base member 1, the latter preferably being of disk form as shown in the drawings, and may have cut-outs 7 so as to lighten the weight thereof. The base member 1 is formed with a hub 8' which is engaged by a rotating cam member 8, the latter being seated on a spacing washer 9 which surrounds the hub 8', being secured thereto by means of a screw 10. It will be noted that the periphery of the member 8 is of spiral or cam form and has a series of graduations 11 which latter are extended throughout the periphery of the cam, although the drawings show but several of such graduations. The cam member 8 may also have apertured portions 12 so as to lighten its weight.

In use of the invention, the wire, drill or other object is engaged with the inner end of the anvil 4 and the cam is then rotated until same engages the wire or drill and impinges same against the anvil, whereupon the scale reading opposite the line 6 of the anvil will indicate the diameter or gauge of the wire, drill, or other object being measured. However, the invention is susceptible of various modifications of the peripheral or marginal edge of the cam, so as to not only increase the range of use of the cam, i. e., for use with articles having considerable range of variations in diameter, but also as concerns the exact shape of such peripheral edge so as to facilitate measurement and reading of the measurements of vari-diametered articles.

Having thus described our invention what we claim as new and desire to secure by Letters Patent, is:—

1. In a measuring gauge, a base member of substantially circular shape formed to receive the article to be measured on the upper face thereof and having a radial extension, a calibrated disk rotatably supported on said base member, the periphery of said disk being formed substantially spiral and the ends of the spiral being spaced a substantial distance from each other radially of the disk, and an anvil fixedly carried by the extension and having a reading line cooperating with the calibrations on said disk, said anvil being spaced from said disk to receive articles to be measured therebetween, said base member and its extension having under faces which lie in substantially the same plane whereby to firmly support the same on a work bench or the like.

2. In a measuring gauge, a base member formed to receive the article to be measured on the upper face thereof and having a radial extension, a calibrated disk rotatably supported on said base member, the periphery of said disk being formed substantially spiral and the ends of the spiral being spaced a substantial distance from each other radially of the disk, and an anvil fixedly carried by the extension and having a reading line cooperating with the calibrations on said disk, said anvil being spaced from said disk to receive articles to be measured therebetween, said base member being formed to seat flat on a supporting surface and having portions thereof extending beyond the pivot of the disk for sufficient distances so as to firmly hold the member in position on the supporting surface.

In testimony whereof we have signed our names to this specification.

MALCOLM K. PARKHURST.
JOHN W. PARKER.